United States Patent
Osagawa

(10) Patent No.: US 9,882,705 B2
(45) Date of Patent: Jan. 30, 2018

(54) COMMUNICATION APPARATUS, COMMUNICATION METHOD, AND COMPUTER READABLE MEDIUM USING PROPAGATION DELAY FOR TIME SYNCHRONIZATION

(71) Applicant: Mitsubishi Electric Corporation, Tokyo (JP)

(72) Inventor: Daisuke Osagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/112,867

(22) PCT Filed: May 23, 2014

(86) PCT No.: PCT/JP2014/063703
§ 371 (c)(1),
(2) Date: Jul. 20, 2016

(87) PCT Pub. No.: WO2015/177923
PCT Pub. Date: Nov. 26, 2015

(65) Prior Publication Data
US 2016/0344537 A1    Nov. 24, 2016

(51) Int. Cl.
*H04J 3/06* (2006.01)
*H04L 7/00* (2006.01)
*H04L 12/26* (2006.01)

(52) U.S. Cl.
CPC .......... *H04L 7/0033* (2013.01); *H04J 3/0655* (2013.01); *H04J 3/0682* (2013.01); *H04L 43/0852* (2013.01)

(58) Field of Classification Search
CPC ................................................... H04L 7/0033
(Continued)

(56) References Cited

U.S. PATENT DOCUMENTS

| 5,014,344 A * | 5/1991 | Goldberg | H04H 20/67 340/7.26 |
| 6,243,369 B1 * | 6/2001 | Grimwood | H04J 3/0682 370/335 |

(Continued)

FOREIGN PATENT DOCUMENTS

| CN | 101578806 A | 11/2009 |
| JP | 11-27269 A | 1/1999 |

(Continued)

OTHER PUBLICATIONS

Chinese Office Action issued in the corresponding Chinese Patent Application No. 201480079218.9; dated Aug. 2, 2017, with a Machine translation thereof.

*Primary Examiner* — Guang Li
(74) *Attorney, Agent, or Firm* — Birch, Stewart, Kolasch & Birch, LLP

(57) ABSTRACT

A synchronous frame reception unit receives a synchronous frame describing a reference value for time synchronization with a management apparatus which is transmitted repeatedly from the management apparatus. A propagation delay computation unit computes, each time when the synchronous frame is received, a propagation delay of the synchronous frame. A propagation delay time period computation unit computes, each time when the propagation delay is computed, a propagation delay time period by adding a target value of a synchronous accuracy to the propagation delay. A propagation delays computation unit operates a logical OR operation of M pieces of propagation delay time periods computed for M pieces of synchronous frames which precede a latest synchronous frame. A synchronous determination unit decides, based on the propagation delay of the latest synchronous frame and a logical OR operation result of the M pieces of propagation delay time periods of the M pieces of synchronous frames, whether or not to use (Continued)

the reference value described in the latest synchronous frame for time synchronization with the management apparatus.

7 Claims, 4 Drawing Sheets

(58) Field of Classification Search
USPC .......................................................... 370/503
See application file for complete search history.

(56) References Cited

U.S. PATENT DOCUMENTS

| | | | |
|---|---|---|---|
| 6,961,352 B2* | 11/2005 | Bouquier | H04B 1/70735 370/503 |
| 7,035,269 B2* | 4/2006 | Rolston | H04J 3/0685 370/400 |
| 7,876,791 B2* | 1/2011 | Jung | H04J 3/0667 370/345 |
| 8,004,993 B2* | 8/2011 | Angelow | H04L 12/40032 370/240 |
| 8,228,955 B2* | 7/2012 | Tamaki | H04W 56/003 370/337 |
| 8,295,310 B2* | 10/2012 | Fourcand | H04J 3/0602 370/504 |
| 8,755,369 B2* | 6/2014 | Kim | H04W 56/0045 370/252 |
| 8,942,201 B1* | 1/2015 | Duvvuri | H04W 28/044 370/314 |
| 9,112,603 B2* | 8/2015 | Shin | H04B 10/0775 |
| 9,438,363 B2* | 9/2016 | Arakawa | H04L 12/40 |
| 2003/0007470 A1* | 1/2003 | Grilli | H04B 7/2668 370/335 |
| 2004/0109474 A1 | 6/2004 | Koshino et al. | |
| 2006/0050827 A1* | 3/2006 | Saeki | H03M 9/00 375/362 |
| 2006/0088056 A1* | 4/2006 | Quigley | H04L 41/142 370/468 |
| 2007/0140127 A1* | 6/2007 | Frei | H04J 3/0655 370/238 |
| 2009/0302910 A1* | 12/2009 | Maeda | H03K 5/13 327/161 |
| 2010/0008383 A1 | 4/2010 | Koga et al. | |
| 2014/0369342 A1 | 12/2014 | Kondo et al. | |
| 2015/0019670 A1* | 1/2015 | Redmann | H04L 65/4092 709/207 |
| 2015/0124844 A1* | 5/2015 | Suzuki | H04J 3/0667 370/519 |
| 2015/0156009 A1* | 6/2015 | Bogdan | H04L 27/2601 375/376 |

FOREIGN PATENT DOCUMENTS

| | | |
|---|---|---|
| JP | 2003-50288 A | 2/2003 |
| JP | 2004-186877 A | 7/2004 |
| JP | 2009-77207 A | 4/2009 |
| JP | 2013-121014 A | 6/2013 |
| JP | 2013-121114 A | 6/2013 |
| WO | 2013/129672 A1 | 9/2013 |

* cited by examiner

COMMUNICATION APPARATUS, COMMUNICATION METHOD, AND COMPUTER READABLE MEDIUM USING PROPAGATION DELAY FOR TIME SYNCHRONIZATION

TECHNICAL FIELD

The present invention relates to time synchronization.

BACKGROUND ART

For example, in a factory line, in order to cooperatively operate a plurality of node apparatuses, it is required that each node apparatus has a common time with which operation timing is regulated.

A network connects node apparatuses, and a mechanism for making each node apparatus to have the common time via the network is known as time synchronization.

Time synchronization between node apparatuses is performed between a node apparatus (hereinafter referred to as a master apparatus) having a reference time and node apparatus (hereinafter referred to as a slave apparatus) that makes an internal time coincide with the reference time.

Usually, time synchronization is operated by the following procedure.
(1) The master apparatus computes a propagation delay (calculation value) to each slave apparatus and notifies each slave apparatus of the propagation delay.
(2) The master apparatus transmits a synchronous frame in which a transmission time is held to the slave apparatus.
(3) The slave apparatus sets a reception time of the synchronous frame to a synchronous time {transmission time+propagation delay (calculation value)}.

However, since a propagation delay (actual measurement value) taken from the above (2) to (3) varies, a deviation occurred between the propagation delay (calculation value) computed in (1) and the propagation delay (actual measurement value) causes a synchronous error.

In a conventional time synchronization, based on a stochastic process, the slave apparatus restrains the synchronous error by measuring the transition of the propagation delay (actual measurement value) and estimating the propagation delay (actual measurement value) (for example, Patent Literature 1).

CITATION LIST

Patent Literature

Patent Literature 1: JP 2013-121114 A

SUMMARY OF INVENTION

Technical Problem

However, in the conventional time synchronization, there has been a problem that the slave apparatus is required to hold the stochastic process so that the processing becomes complicated.

The present invention mainly aims to solve a problem such as the above and mainly aims to prevent the synchronous error by simple processing.

Solution to Problem

A communication apparatus according to the present invention includes:

a synchronous frame reception unit to receive a synchronous frame describing a reference value for time synchronization a the management apparatus, which is transmitted repeatedly from the management apparatus;

a propagation delay computation unit to compute, each time when the synchronous frame is received by the synchronous frame reception unit, a propagation delay of the received synchronous frame;

a propagation delay time period computation unit to compute, each time when the propagation delay is computed by the propagation delay computation unit, a propagation delay time period by adding a target value of a synchronous accuracy to the computed propagation delay;

a logical OR operation unit to operate a logical OR operation of M (M≥2) pieces of propagation delay time periods computed for M pieces of synchronous frames which precede a latest synchronous frame received by the synchronous frame reception unit; and a time synchronization decision unit to decide, based on a propagation delay of the latest synchronous frame and a logical OR operation result of the M pieces of propagation delay time periods of the M pieces of synchronous frames, whether or not to use a reference value described in the latest synchronous frame for time synchronization with the management apparatus.

Advantageous Effects of Invention

According to the present invention, based on the propagation delay time period of the latest synchronous frame and the logical OR operation result of the preceding M pieces of propagation delay time periods of the M pieces of synchronous frames, it is decided whether or not the reference value described in the latest synchronous frame is used as time synchronization.

Thereby, synchronization can be performed only by the synchronous frame of the propagation delay which is not an out-of-synchronization, and the synchronous error can be prevented by simple processing.

DESCRIPTION OF EMBODIMENT

Embodiment 1

For example, in a factory line, in order to secure a real-time property, a communication timing of each node apparatus is adjusted not to overlap communication timings between node apparatuses.

Therefore, a variation distribution of propagation delays (actual measurement values) is approximated to a normal distribution because of a variation distribution of delays occurring in a relay station and a cable.

Accordingly, from the variation distribution of propagation delays (actual measurement values), a number of times of communications (M(M≥2) times) required to generate a communication at least one time which satisfies a target synchronous accuracy can be predicted.

In the present embodiment, when a propagation delay of a latest synchronous frame is within (propagation delay±target synchronous accuracy X) of past M pieces of synchronous frames, the latest synchronous frame is extracted as a synchronous frame with a high synchronous accuracy. Hence, time synchronization with high accuracy is achieved easily by performing time synchronization using the latest synchronous frame.

Figure 1:
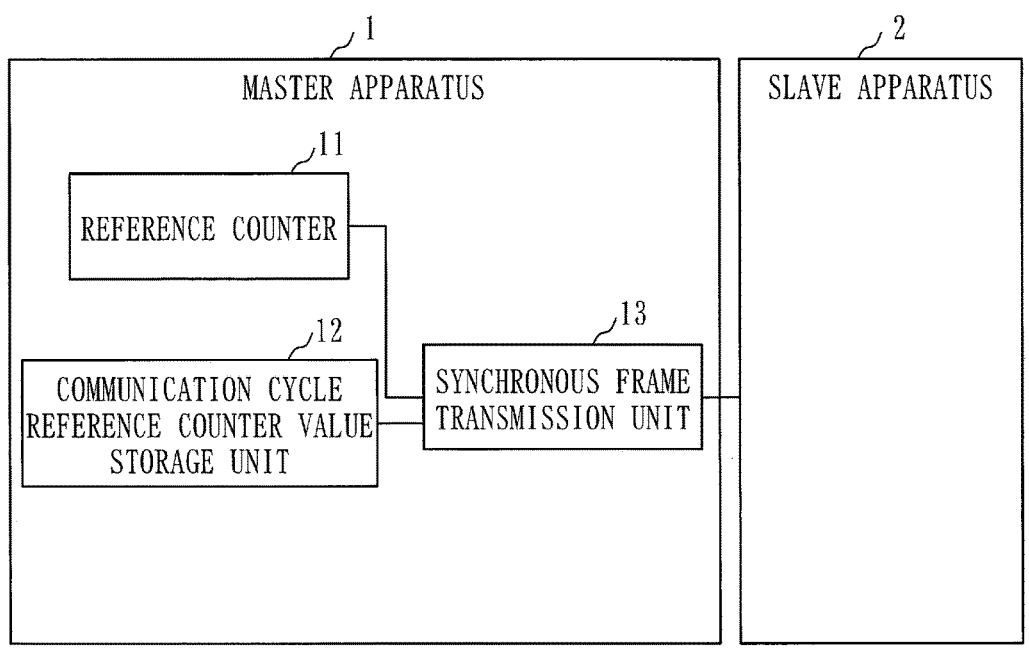
FIG. 1 is a diagram illustrating a configuration example of a master apparatus according to a first embodiment.
Figure 2:
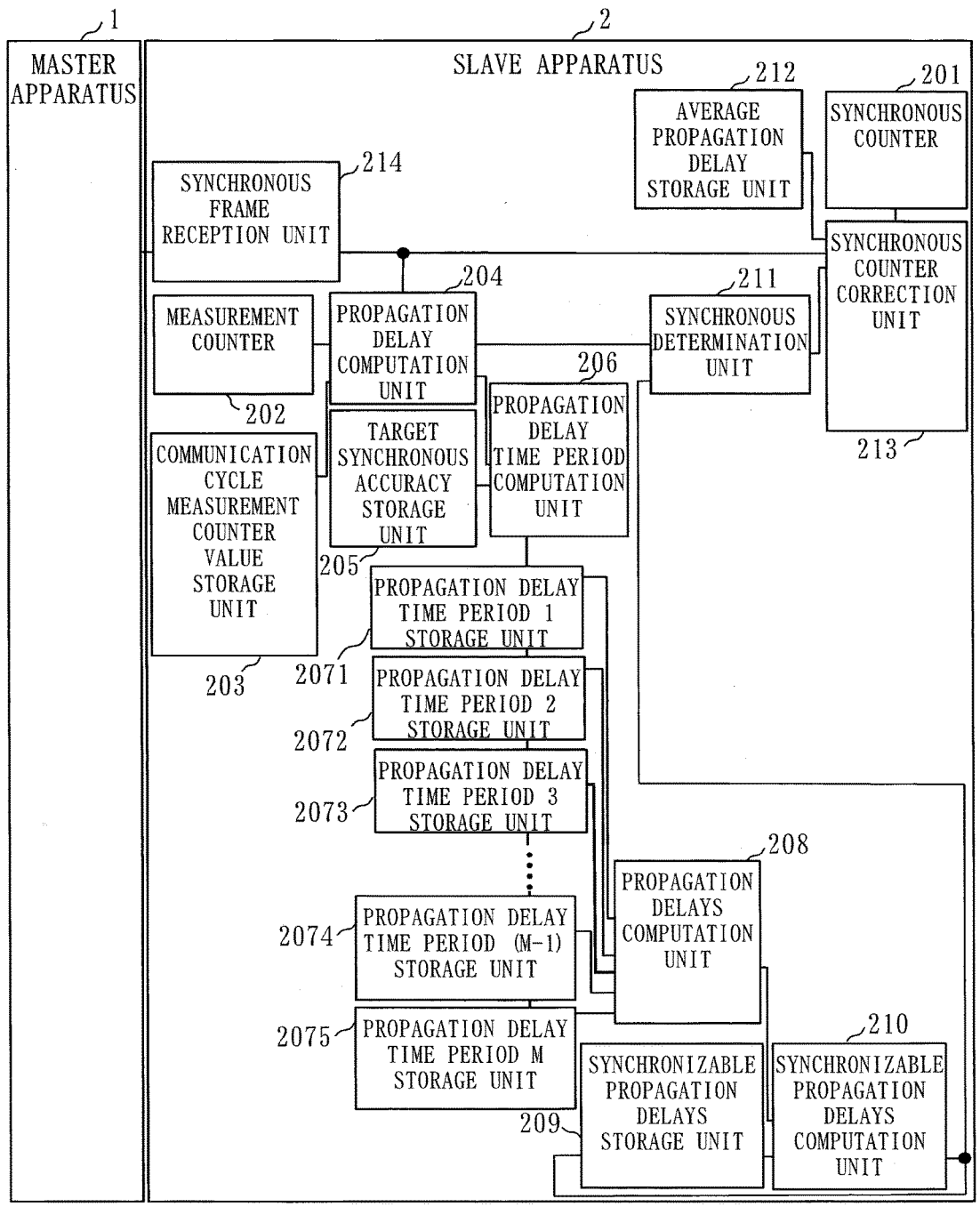
FIG. 2 is a diagram illustrating a configuration example of a slave apparatus according to the first embodiment.

FIG. 1 illustrates a configuration example of a master apparatus according to the present embodiment, and FIG. 2 illustrates a configuration example of a slave apparatus according to the present embodiment.

In FIGS. 1 and 2, the master apparatus 1 is a node apparatus having a reference time, and the slave apparatus 2 is a node apparatus that generates a time, based on a communication frame from the master apparatus 1, of which a deviation from the reference time is small.

A plurality of slave apparatuses 2 may be located on one network. Further, one or more relay stations may be located between the master apparatus 1 and the slave apparatus 2.

The master apparatus 1 corresponds to an example of a management apparatus, and the slave apparatus 2 corresponds to an example of a communication apparatus.

In the master apparatus 1, a reference counter 11 counts the reference time.

A communication cycle reference counter value storage unit 12 stores a communication cycle (hereinafter referred to as a master apparatus communication cycle) of a synchronous frame on a basis of a value of the reference counter 11.

When the value of the reference counter 11 becomes N times (N is a natural number) of the master apparatus communication cycle stored in the communication cycle reference counter value storage unit 12, a synchronous frame transmission unit 13 transmits the synchronous frame in which the value of the reference counter 11 and a number of times of communications N are described.

The value of the reference counter 11 described in the synchronous frame corresponds to an example of a reference value.

In the slave apparatus 2, a synchronous frame reception unit 214 receives the synchronous frame transmitted from the master apparatus 1.

The synchronous frame reception unit 214 outputs the received synchronous frame to a propagation delay computation unit 204 and a synchronous counter correction unit 213 described below.

A synchronous counter 201 counts the time of the slave apparatus 2.

A measurement counter 202 measures a communication timing of the slave apparatus 2.

A communication cycle measurement counter value storage unit 203 stores a communication cycle (hereinafter referred to as a slave apparatus communication cycle) of the synchronous frame on a basis of a value of the measurement counter 202.

When the synchronous frame reception unit 214 receives the synchronous frame, the propagation delay computation unit 204 computes a propagation delay including an offset between the master apparatus 1 and the slave apparatus 2, the propagation delay being obtained by subtracting a value of multiplying the slave apparatus communication cycle stored in the communication cycle measurement counter value storage unit 203 with the number of times of communications N held in the synchronous frame from the value of the measurement counter 202 at the time of reception.

The propagation delay computed by the propagation delay computation unit 204 is hereinafter referred to as an offset propagation delay.

The offset propagation delay corresponds to a value obtained by adding the value of the measurement counter 202 when the reference counter 11 is 0 to the propagation delay time.

A target synchronous accuracy storage unit 205 stores target synchronous accuracies X between the reference counter 11 and the synchronous counter 201.

The target synchronous accuracy X is a deviation allowed between the time of the master apparatus 1 and the time of the slave apparatus 2.

As described below, the target synchronous accuracy X is added to the offset propagation delay (offset propagation delay±target synchronous accuracy X).

A propagation delay time period computation unit 206 computes a propagation delay time period (time period from (offset propagation delay−target synchronous accuracy X) to (offset propagation delay+target synchronous accuracy X)) in which the target synchronous accuracy X stored in the target synchronous accuracy storage unit 205 is reflected into the offset propagation delay computed by the propagation delay computation unit 204 and stores the computed propagation delay time period.

Further, the propagation delay time period computation unit 206 outputs a previously computed propagation delay time period each time when the offset propagation delay is computed by the propagation delay computation unit 204.

A propagation delay time period 1 storage unit 2071 stores a propagation delay time period of a synchronous frame preceding by one piece to the latest synchronous frame received by the slave apparatus 2.

A propagation delay time period 2 storage unit 2072 stores a propagation delay time period of a synchronous frame preceding by two pieces to the latest synchronous frame received by the slave apparatus 2.

A propagation delay time period 3 storage unit 2073 stores a propagation delay time period of a synchronous frame preceding by three pieces to the latest synchronous frame received by the slave apparatus 2.

A propagation delay time period (M−1) storage unit 2074 stores a propagation delay time period of a synchronous frame preceding by (M−1) pieces to the latest synchronous frame received by the slave apparatus 2.

A propagation delay time period M storage unit 2075 stores a propagation delay time period of a synchronous frame preceding by M pieces to the latest synchronous frame received by the slave apparatus 2.

Hereinafter, when the propagation delay time period 1 storage unit 2071, the propagation delay time period 2 storage unit 2072, the propagation delay time period 3 storage unit 2073, the propagation delay time period (M−1) storage unit 2074, and the propagation delay time period M storage unit 2075 are not required to be distinguished, these are collectively called as a propagation delay time period storage unit 207.

A propagation delays computation unit 208 operates a logical OR operation of propagation delay time periods stored in M pieces of propagation delay time period storage units 207 and outputs a propagation delays being a propagation delay time period after the logical OR operation.

The propagation delays computation unit 208 corresponds to an example of a logical OR operation unit.

A synchronizable propagation delays storage unit 209 stores a synchronizable propagation delays computed by a synchronizable propagation delays computation unit 210 described below.

The synchronizable propagation delays storage unit 209 is updated by a newly computed synchronizable propagation delays each time when the synchronizable propagation delays computation unit 210 computes the synchronizable propagation delays.

The synchronizable propagation delays storage unit 209 corresponds to an example of a logical AND operation result storage unit.

The synchronizable propagation delays computation unit 210 operates a logical AND operation between the propagation delays computed by the propagation delays computation unit 208 and the synchronizable propagation delays stored in the synchronizable propagation delays storage unit 209, to compute the synchronizable propagation delays at the time of receiving the latest synchronous frame.

At the time of receiving the latest synchronous frame, in the synchronizable propagation delays storage unit 209, a synchronizable propagation delays computed by the synchronizable propagation delays computation unit 210 at the time of receiving the synchronous frame preceding by one piece to the latest synchronous frame is stored.

As described, the synchronizable propagation delays computation unit 210 operates the logical AND operation between the synchronizable propagation delays at the time of receiving the synchronous frame preceding by one and the propagation delays computed by the propagation delays computation unit 208, to compute the synchronizable propagation delays at the time of receiving the latest synchronous frame.

Then, the synchronizable propagation delays computation unit 210 stores the computed synchronizable propagation delays to the synchronizable propagation delays storage unit 209.

The synchronizable propagation delays computation unit 210 corresponds to an example of a logical AND operation unit.

A synchronous determination unit 211 determines whether or not the offset propagation delay at the time of receiving the latest synchronous frame is included in the synchronizable propagation delays computed by the synchronizable propagation delays computation unit 210 and outputs a synchronizable signal when the offset propagation delay at the time of receiving the latest synchronous frame is included in the synchronizable propagation delays.

The synchronous determination unit 211 corresponds to, together with the synchronous counter correction unit 213 described below, an example of a time synchronization decision unit.

An average propagation delay storage unit 212 stores an average value (hereinafter referred to as an average propagation delay) of the propagation delay between the master apparatus 1 and the slave apparatus 2.

The synchronous counter correction unit 213 stores the value of the reference counter 11 held in the synchronous frame, and when the synchronizable signal is received from the synchronous determination unit 211, writes a value obtained by adding the average propagation delay stored in the average propagation delay storage unit 212 to the value of the reference counter 11 to the synchronous counter 201.

That is, when receiving the synchronizable signal from the synchronous determination unit 211, the synchronous counter correction unit 213 decides to use the value of the reference counter 11 in the latest synchronous frame for time synchronization with the master apparatus 1.

The synchronous counter correction unit 213 corresponds to, together with the synchronous determination unit 211 described above, an example of the time synchronization decision unit.

Next, the operation will be described.

Firstly, in the master apparatus 1, when the value of the reference counter 11 becomes N times (N is a natural number) of the master apparatus communication cycle stored in the communication cycle reference counter value storage unit 12, the synchronous frame transmission unit 13 transmits the synchronous frame holding the value of the reference counter and the number of times of communications N to the slave apparatus 2.

The master apparatus 1 transmits the synchronous frame to the slave apparatus 2 each time when the value of the reference counter 11 becomes N times of the master apparatus communication cycle as described.

Figure 3:
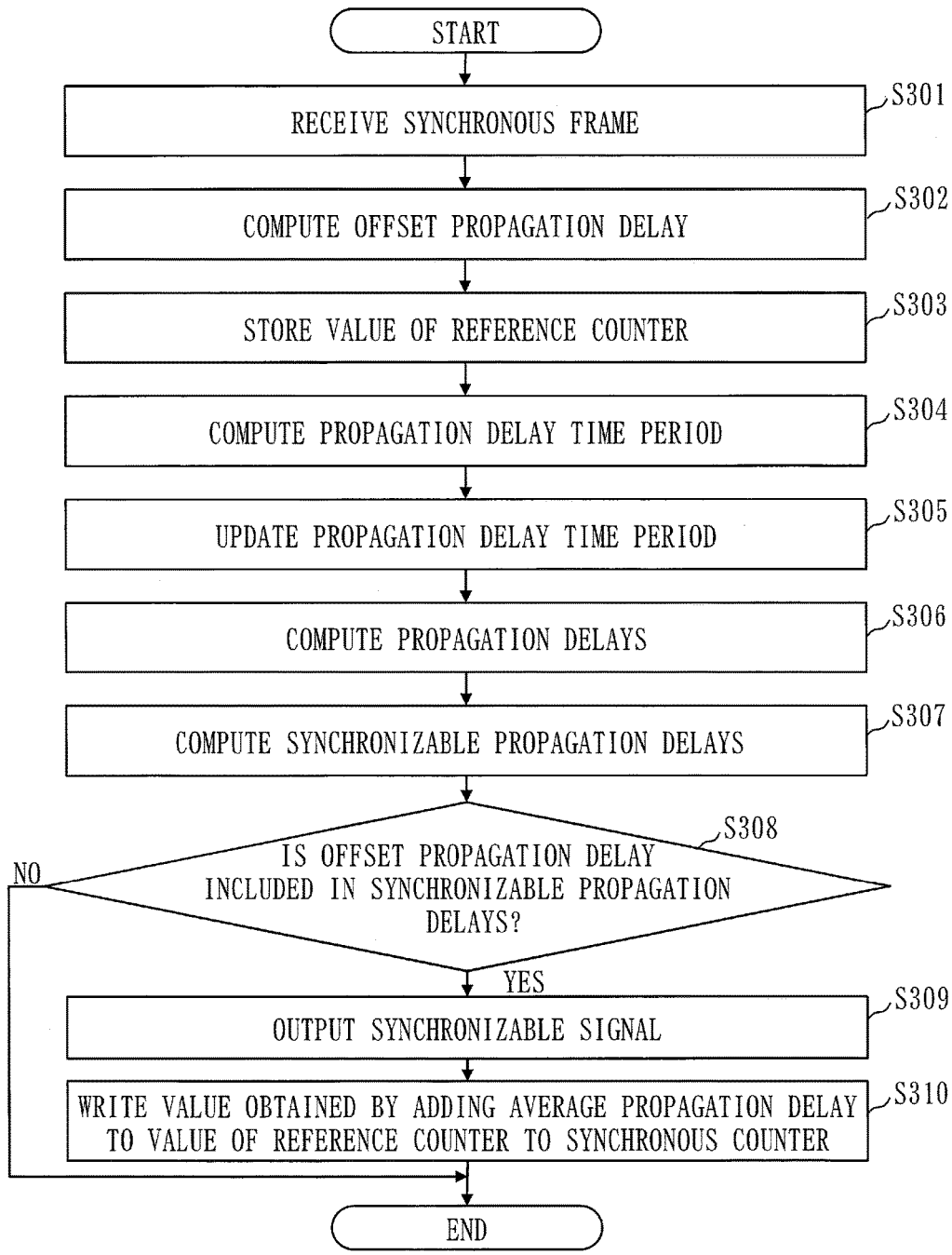
FIG. 3 is a flowchart diagram illustrating an operation example of the slave apparatus according to the first embodiment.

Next, using a flowchart of FIG. 3, the operation of the slave apparatus 2 will be described.

In the slave apparatus 2, when the synchronous frame reception unit 214 receives the synchronous frame (S301), the propagation delay computation unit 204 computes the offset propagation delay, the offset propagation delay being obtained by subtracting the value of multiplying the slave apparatus communication cycle stored in the communication cycle measurement counter value storage unit 203 with the number of times of communications N held in the synchronous frame from the value of the measurement counter 202 at the time of reception (S302).

Further, at the same time, the synchronous counter correction unit 213 stores the value of the reference counter held in the synchronous frame (S303).

When the propagation delay computation unit 204 computes the offset propagation delay, the propagation delay time period computation unit 206 outputs the previous computed propagation delay time period, computes the propagation delay time period (time period from (offset propagation delay−target synchronous accuracy X) to (offset propagation delay+target synchronous accuracy X)) by adding the target synchronous accuracy X stored in the target synchronous accuracy storage unit 205 to the offset propagation delay (S304), and stores the computed propagation delay time period.

When the propagation delay time period computation unit 206 outputs the previous propagation delay time period, the M pieces of propagation delay time period storage units 207 update the propagation delay time periods (S305).

Specifically, the propagation delay time period 1 storage unit 2071 newly stores the previous propagation delay time period which is output from the propagation delay time period computation unit 206 and outputs the propagation delay time period which has been stored to the propagation delay time period 2 storage unit 2072.

When the propagation delay time period 1 storage unit 2071 outputs the propagation delay time period, the propagation delay time period 2 storage unit 2072 newly stores the propagation delay time period which is output from the propagation delay time period 1 storage unit 2071 and outputs the propagation delay time period which has been stored to the propagation delay time period 3 storage unit 2073.

This operation is repeated until the propagation delay time period (M−1) storage unit 2074.

When the propagation delay time period (M−1) storage unit 2074 outputs the propagation delay time period, the propagation delay time period M storage unit 2075 newly stores the propagation delay time period which is output from the propagation delay time period (M−1) storage unit 2074.

When the propagation delay time period M storage unit 2075 stores the new propagation delay time period, the propagation delays computation unit 208 computes the propagation delays by operating the logical OR operation of the propagation delay time periods stored in the M pieces of propagation delay time period storage units 207 (S306).

When the propagation delays computation unit 208 computes the propagation delays, the synchronizable propagation delays computation unit 210 computes the synchronizable propagation delays at the time of receiving the latest synchronous frame by operating the logical AND operation between the propagation delays and the synchronizable propagation delays (synchronizable propagation delays at the time of receiving the synchronous frame preceding by one piece to the latest synchronous frame) stored in the synchronizable propagation delays storage unit 209 (S307).

When the synchronizable propagation delays computation unit 210 computes the synchronizable propagation delays at the time of receiving the latest synchronous frame, the synchronizable propagation delays storage unit 209 stores the synchronizable propagation delays at the time of receiving the latest synchronous frame.

Further, the synchronous determination unit 211 determines whether or not the offset propagation delay at the time of receiving the latest synchronous frame is included in the synchronizable propagation delays computed by the synchronizable propagation delays computation unit 210 (S308).

When the offset propagation delay at the time of receiving the latest synchronous frame is included in the synchronizable propagation delays (YES in S308), the synchronous determination unit 211 outputs the synchronizable signal (S309).

When the synchronous determination unit 211 outputs the synchronizable signal, the synchronous counter correction unit 213 writes the value obtained by adding the average propagation delay stored in the average propagation delay storage unit 212 to the value of the reference counter 11 to the synchronous counter 201 (S310).

Thereby, the synchronous accuracy can be improved by performing synchronization only with the synchronous frame of the propagation delay which is not an out-of-synchronization.

Note that, in the above, it is described as an example that the synchronous determination unit 211 determines whether or not the offset propagation delay of the latest synchronous frame is included in the synchronizable propagation delays.

Alternatively, the synchronous determination unit 211 may determine whether or not the offset propagation delay of the latest synchronous frame is included in the propagation delays computed by the propagation delays computation unit 208.

That is, the synchronizable propagation delays storage unit 209 and the synchronizable propagation delays computation unit 210 are eliminated from the configuration of FIG. 2, and a configuration may be employed in which the propagation delays computed by the propagation delays computation unit 208 is input to the synchronous determination unit 211 directly.

Then, the synchronous determination unit 211 may determine whether or not the offset propagation delay of the latest synchronous frame is included in the propagation delays, and when the offset propagation delay of the latest synchronous frame is included in the propagation delays, the synchronous determination unit 211 may output the synchronizable signal.

Lastly, a hardware configuration example of the master apparatus 1 and the slave apparatus 2 indicated in the present embodiment will be described with reference to FIG. 4.

The master apparatus 1 and the slave apparatus 2 are computers, and each component of the master apparatus 1 and the slave apparatus 2 can be implemented by a program.

As the hardware configuration of the master apparatus 1 and the slave apparatus 2, an arithmetic device 901, an external storage device 902, a main storage device 903, a communication device 904, and an input/output device 905 are connected to a bus.

The arithmetic device 901 is a CPU (Central Processing Unit) that executes programs.

The external storage device 902 is, for example, a ROM (Read Only Memory), a flash memory, or a hard disk device.

The main storage device 903 is a RAM (Random Access Memory).

The communication device 904 is, for example, a NIC (Network Interface Card) and corresponds to a physical layer of the synchronous frame transmission unit 13 and the synchronous frame reception unit 214.

The input/output device 905 is, for example, a touch panel type display device, or the like.

The programs are usually stored in the external storage device 902 and are loaded into the main storage device 903 to be sequentially read and executed by the arithmetic device 901

The programs are those which implement functions each described as "unit" ("storage unit" excluded; the same also applies hereinafter) illustrated in FIG. 1.

Further, the external storage device 902 also stores an operating system (OS), and at least a part of the OS is loaded into the main storage device 903. The arithmetic device 901 executes the programs each of which implements the function of "unit" illustrated in FIG. 1, while executing the OS.

Further, in the description of the present embodiment, information, data, signal values, and variable values indicating the results of the processes described as "judge", "determine", "decide, "operate", "compute", "receive", and the like are stored as files in the main storage device 903.

Figure 4:
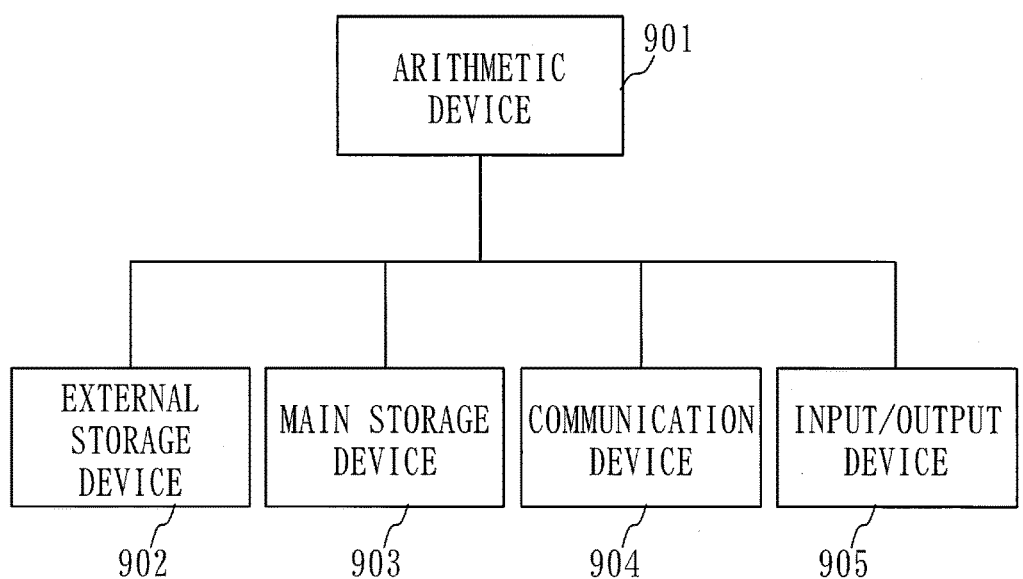
FIG. 4 is a diagram illustrating a hardware configuration example of the master apparatus and the slave apparatus according to the first embodiment.

Note that the configuration of FIG. 4 merely indicates the hardware configuration example of the master apparatus 1 and the slave apparatus 2, and the hardware configuration of the master apparatus 1 and the slave apparatus 2 is not limited to the configuration illustrated in FIG. 4, but can be another configuration.

Further, by the procedure indicated in the present embodiment, the communication method according to the present invention can be implemented.

REFERENCE SIGNS LIST

1: master apparatus, 2: slave apparatus, 11: reference counter, 12: communication cycle reference counter value storage unit, 13: synchronous frame transmission unit, 201: synchronous counter, 202: measurement counter, 203: communication cycle measurement counter value storage unit, 204: propagation delay computation unit, 205: target synchronous accuracy storage unit, 206: propagation delay time period computation unit, 207: propagation delay time period storage unit, 2071: propagation delay time period 1 storage unit, 2072: propagation delay time period 2 storage unit, 2073: propagation delay time period 3 storage unit, 2074: propagation delay time period (M−1) storage unit, 2075:

propagation delay time period M storage unit, 208: propagation delays computation unit, 209: synchronizable propagation delays storage unit, 210: synchronizable propagation delays computation unit, 211: synchronous determination unit, 212: average propagation delay storage unit, 213: synchronous counter correction unit, and 214: synchronous frame reception unit.

The invention claimed is:

1. A communication apparatus comprising:
processing circuitry to:
receive a synchronous frame describing a reference value for time synchronization with a management apparatus, which is transmitted repeatedly from the management apparatus;
compute, each time when the synchronous frame is received, a propagation delay of the received synchronous frame;
compute, each time when the propagation delay is computed, a propagation delay time period by adding a target value of a synchronous accuracy to the computed propagation delay;
operate a logical OR operation of M pieces of propagation delay time periods computed for M pieces of synchronous frames which precede a received latest synchronous frame, where M is greater than or equal to 2; and
decide, based on a propagation delay of the latest synchronous frame and a logical OR operation result of the M pieces of propagation delay time periods of the M pieces of synchronous frames, whether or not to use a reference value described in the latest synchronous frame for time synchronization with the management apparatus.

2. The communication apparatus according to claim 1,
wherein the processing circuitry determines whether or not the propagation delay of the latest synchronous frame is included in the logical OR operation result of the M pieces of propagation delay time periods, and decide to use the reference value described in the latest synchronous frame for time synchronization with the management apparatus, when the propagation delay of the latest synchronous frame is included in the logical OR operation result.

3. The communication apparatus according to claim 1,
wherein the processing circuitry further stores a logical AND operation result,
operates a logical AND operation between the logical OR operation result and the stored logical AND operation result;
stores, each time when the logical AND operation is operated, the logical AND operation result,
operates the logical AND operation between the logical OR operation result of the M pieces of the propagation delay time periods of the M pieces of synchronous frames and the stored logical AND operation result at the time of receiving the latest synchronous frame, and
decides whether or not to use the reference value described in the latest synchronous frame for time synchronization with the management apparatus, based on the propagation delay of the latest synchronous frame and the logical AND operation result.

4. The communication apparatus according to claim 3,
wherein the time synchronization decision unit determines whether or not the propagation delay of the latest synchronous frame is included in the logical AND operation result of the logical AND operation unit, and decide to use the reference value described in the latest synchronous frame for time synchronization with the management apparatus when the propagation delay of the latest synchronous frame is included in the logical AND operation result of the logical AND operation unit.

5. The communication apparatus according to claim 1,
wherein the processing circuitry operates the logical OR operation of the M pieces of propagation delay time periods of the most recent M pieces of synchronous frames which precede the latest synchronous frame.

6. A communication method comprising:
receiving, a synchronous frame describing a reference value for time synchronization with a management apparatus, which is transmitted repeatedly from the management apparatus;
computing, each time when the synchronous frame is received, a propagation delay of the received synchronous frame;
computing, each time when the propagation delay is computed, a propagation delay time period by adding a target value of a synchronous accuracy to the computed propagation delay;
operating, a logical OR operation of M pieces of propagation delay time periods computed for M pieces of synchronous frames which precede a latest synchronous frame, where M is greater than or equal to 2; and
deciding, based on a propagation delay of the latest synchronous frame and a logical OR operation result of the M pieces of propagation delay time periods of the M pieces of synchronous frames, whether or not to use a reference value described in the latest synchronous frame for time synchronization with the management apparatus.

7. A non-transitory computer readable medium storing a program to cause a computer to execute:
a synchronous frame reception process of receiving a synchronous frame describing a reference value for time synchronization with a management apparatus, which is transmitted repeatedly from the management apparatus;
a propagation delay computation process of computing, each time when the synchronous frame is received by the synchronous frame reception process, a propagation delay of the received synchronous frame;
a propagation delay time period computation process of computing, each time when the propagation delay is computed by the propagation delay computation process, a propagation delay time period by adding a target value of a synchronous accuracy to the computed propagation delay;
a logical OR operation process of operating a logical OR operation of M pieces of propagation delay time periods computed for M pieces of synchronous frames which precede a latest synchronous frame received by the synchronous frame reception process, where M is greater than or equal to 2; and
a time synchronization decision process of deciding, based on a propagation delay of the latest synchronous frame and a logical OR operation result of the M pieces of propagation delay time periods of the M pieces of synchronous frames, whether or not to use a reference value described in the latest synchronous frame for time synchronization with the management apparatus.

* * * * *